Nov. 24, 1931.  E. A. JOHNSTON  1,832,934
MAGNETO GENERATOR
Filed May 31, 1930  2 Sheets-Sheet 1
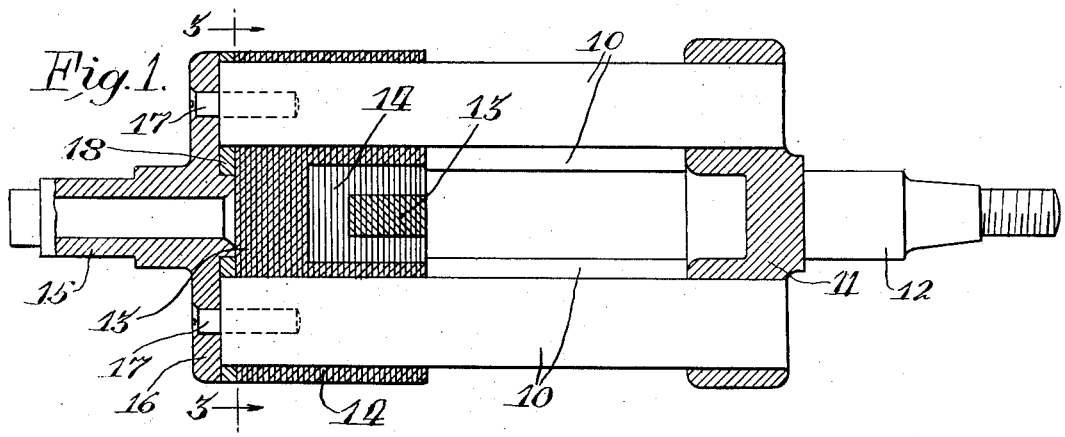
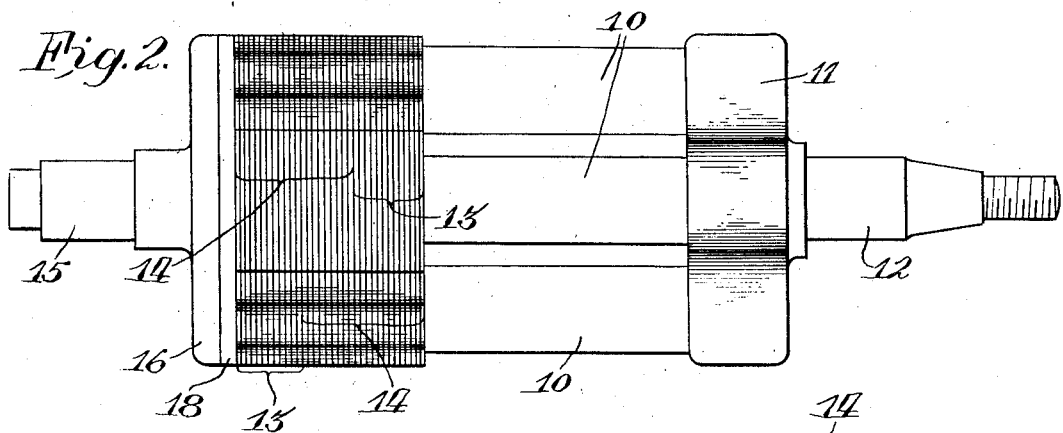
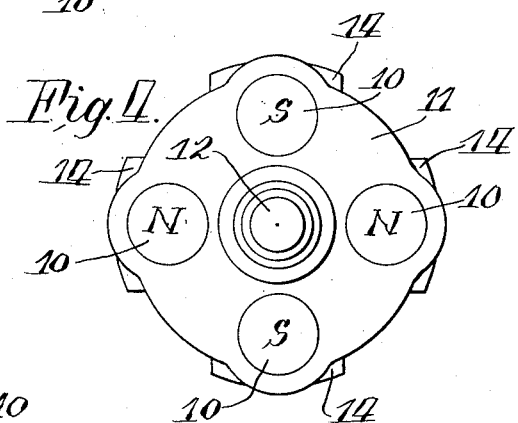
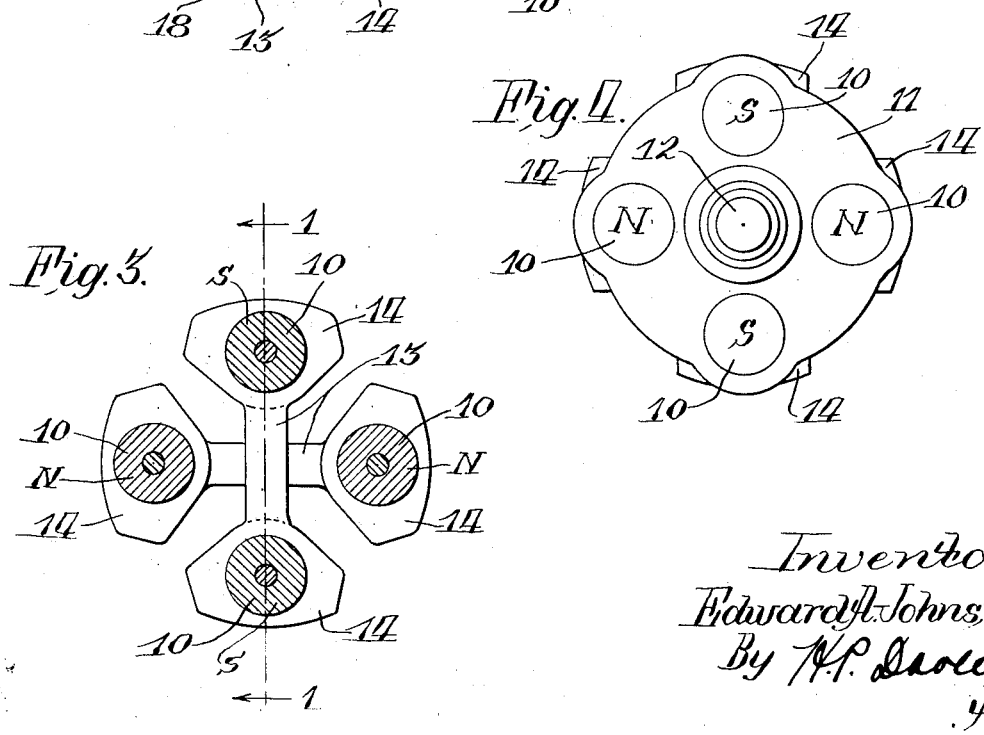
Inventor
Edward A. Johnston
By
Atty Nov. 24, 1931.    E. A. JOHNSTON    1,832,934
MAGNETO GENERATOR
Filed May 31, 1930    2 Sheets-Sheet 2
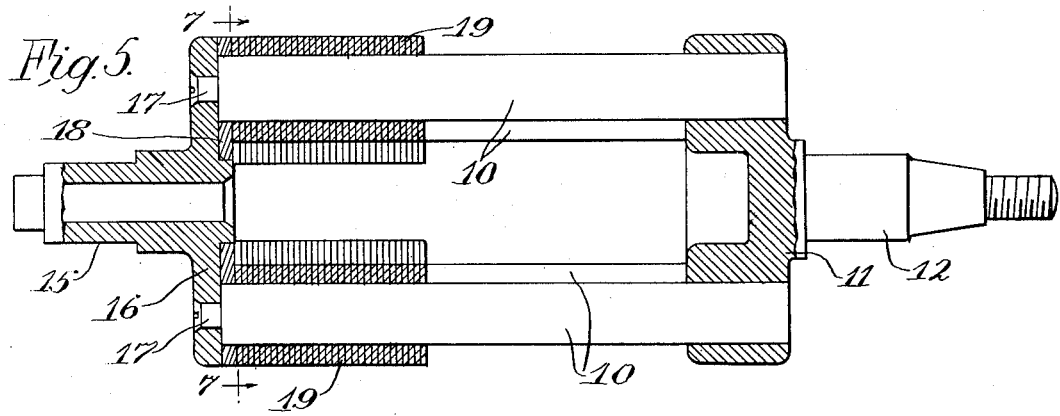
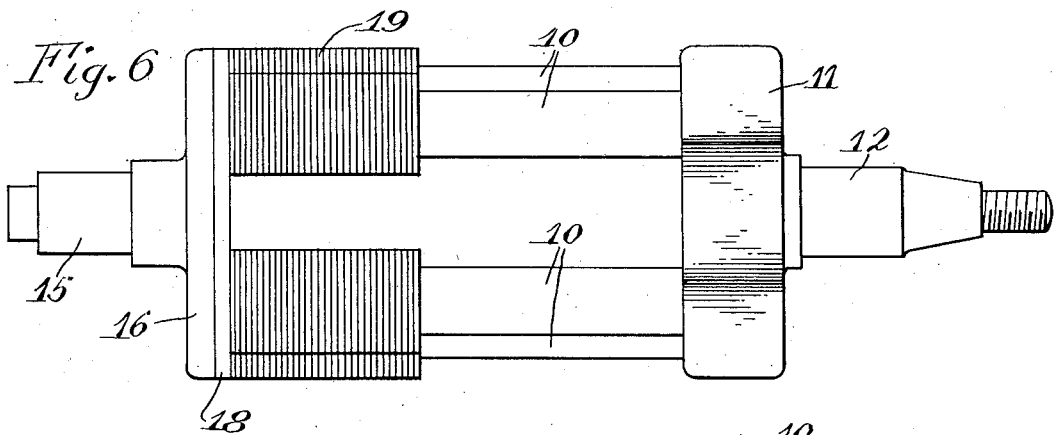
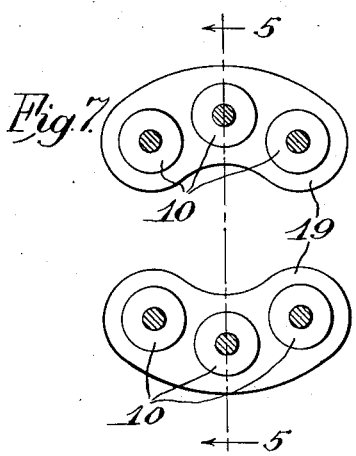
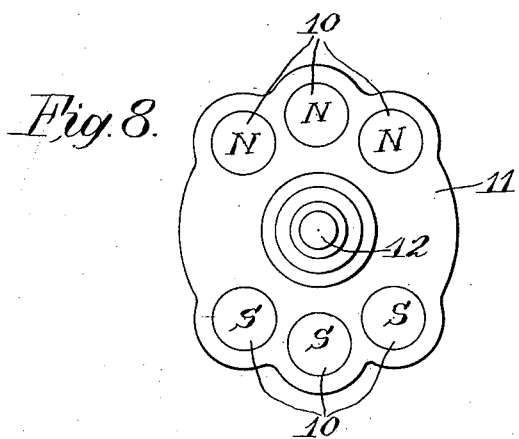
Inventor
Edward A. Johnston Patented Nov. 24, 1931

1,832,934

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

MAGNETO GENERATOR

Application filed May 31, 1930. Serial No. 457,956.

The invention relates to a magneto generator, and particularly to an improved built up magnet rotor for that type of magneto having a stationary armature coil and a rotary magnet.

In prior built up rotary magnets of this kind, trouble has been encountered, especially in volume production thereof, because, with the parts thereof as previously constructed, it did not readily lend itself to manufacture, mainly becouse of complexity and incident high cost.

Accordingly, the primary object of the invention is to provide an improved magnet rotor structure.

Other objects will later become apparent.

These objects are achieved by providing an improved shape of magnet bar and by fitting the same in a better way in the driving end keeper, as shown in the drawings accompanying this application, in which:

Figure 1 is a vertical cross sectional view of a magnet rotor for a four cylinder engine, as seen along the line 1—1 in Figure 3;

Figure 2 is an elevational view of the same magnet;

Figure 3 is an end cross sectional view, as seen along the line 3—3 appearing in Figure 1;

Figure 4 is an end view of the drive end of the same magnet rotor;

Figure 5 is a vertical cross sectional view of a modified magnet rotor for a two cylinder engine, as seen along the line 5—5 of Figure 7;

Figure 6 is an elevational view of the modified magnet rotor;

Figure 7 is an end cross sectional view, as seen along the line 7—7 appearing in Figure 5; and, Figure 8 is an end view of the drive end of the modified rotor.

In the embodiment shown in Figures 1 to 4, inclusive, is shown a four pole rotor designed to produce four sparks per revolution for a four cylinder engine, the magnet bars appearing at 10 and made of a strong magnetic metal, such as cobalt. As indicated, the magnets are disposed in opposite pairs comprising north and south poles. The distributor ends of each magnet are then tapped to provide an axial opening for a purpose later to appear. Each magnet is then hardened in any appropriate manner and ground in a centerless grinder throughout its length. Use of such a grinder is possible, because each magnet is made of round stock, that is, circular in cross section. This method of production materially lessens the cost of manufacturing the magnets. After the grinding operation, the magnets are ready for assembly with a drop forged keeper 11, which includes an integral drive shaft connection 12 and four equidistantly spaced holes, as shown, each of a size slightly smaller than the diameter of the round magnets. Thus, in assembling the magnets in the keeper, each is pressed and drive-fitted into the holes therein, resulting in practically a one-piece solid structure.

So far in assembling the built up structure I have the keeper with four magnet poles extending therefrom. The free ends of these poles are next fitted in a conventional manner with steel laminæ. As best shown in Figures 1, 2 and 3, these laminations extend around the poles from a point midway between the ends thereof to the free ends. They assume two forms, one form shown at 13 being duplex and generally in the shape of a dumb-bell; while the other form is a small shape 14. The duplex laminæ 13 are pressed onto and connect opposed poles of like polarity, and the small shapes are fitted on the poles between the connecting sets of laminations in order to forestall short circuiting between unlike poles. A bronze breaker shaft 15 is formed as part of an end plate 16, which is fastened by screws 17 to the magnets 10, the screws seating in the tapped holes heretofore described. A spacer 18 is provided between the laminæ and end plate 16. The whole structure is finished off by filling all spaces and interstices with a die cast, non-magnetic material to form a substantially cylindrical, well balanced rotor. The device is thus complete and ready for assembly in a magneto of the kind heretofore specified.

A modified two spark per rotation rotor is disclosed in Figures 5 to 8, inclusive, in which the magnets 10 are formed as previously described and similarly forced into openings in the keeper 11 to assemble the parts. Laminations 19, (see Figure 7), are used to connect all north poles. The same kind are used to connect the south poles. Screws 17 secure the end plate 16 to the magnets 10.

Both forms of rotor achieve the objects of the invention by employing round magnets drive-fitted into the keeper.

The scope of the invention is set forth in the following claim.

What is claimed is:

A built up rotary magnet comprising a keeper formed with an integral drive shaft for the magnet and a plurality of holes, a magnet bar pressed into each hole securely to fasten the same to the keeper, laminæ encircling the magnets adjacent their free ends to connect like poles thereof, the free end of each magnet being provided with an axial hole, an end plate including an integrally formed distributor shaft, said plate secured to the magnet bars by screws passed therethrough and into the holes in the ends of the magnet bars, and a spacer between the laminæ and plate.

In testimony whereof I affix my signature.

EDWARD A. JOHNSTON.